United States Patent
Chen et al.

(10) Patent No.: US 9,178,623 B2
(45) Date of Patent: Nov. 3, 2015

(54) PHOTON PHASE MODULATING SYSTEM

(71) Applicant: UNIVERSITY OF SCIENCE AND TECHNOLOGY OF CHINA, Anhui (CN)

(72) Inventors: Wei Chen, Anhui (CN); Shuang Wang, Anhui (CN); Zhenqiang Yin, Anhui (CN); Dajun Huang, Anhui (CN); Yang Yang, Anhui (CN); Zheng Zhou, Anhui (CN); Deyong He, Anhui (CN); Yuhu Li, Anhui (CN); Zhengfu Han, Anhui (CN); Yonggang Wang, Anhui (CN); Guangcan Guo, Anhui (CN)

(73) Assignee: University of Science and Technology China, Anhui (CN)

( * ) Notice: Subject to any disclaimer, the term of this patent is extended or adjusted under 35 U.S.C. 154(b) by 280 days.

(21) Appl. No.: 13/985,565

(22) PCT Filed: Mar. 8, 2013

(86) PCT No.: PCT/CN2013/072350
§ 371 (c)(1),
(2) Date: Aug. 14, 2013

(87) PCT Pub. No.: WO2013/181955
PCT Pub. Date: Dec. 12, 2013

(65) Prior Publication Data
US 2014/0205302 A1     Jul. 24, 2014

(30) Foreign Application Priority Data
Jun. 7, 2012  (CN) .......................... 2012 1 0186768

(51) Int. Cl.
*H04B 10/04*     (2006.01)
*H04B 10/556*    (2013.01)
*H04B 10/70*     (2013.01)
*H04L 9/08*      (2006.01)

(52) U.S. Cl.
CPC ............ *H04B 10/5561* (2013.01); *H04B 10/70* (2013.01); *H04L 9/0852* (2013.01)

(58) Field of Classification Search
CPC .... H04B 10/70; H04B 10/548; H04B 10/556; H04B 10/5561; H04L 9/0852; H04L 9/0855; H04L 9/0883
USPC ......... 398/182, 183, 188, 187, 186, 200, 201, 398/192, 193, 194, 195, 141, 140, 158, 159, 398/151, 135, 136, 79; 380/256, 278, 279, 380/283, 255, 44, 273
See application file for complete search history.

(56) References Cited

U.S. PATENT DOCUMENTS 8,270,841 B2 * 9/2012 Nishioka ................ H04B 10/70
                                                           380/255
8,718,485 B2 * 5/2014 Tanaka ................. H04B 10/548
                                                           398/185

(Continued)

FOREIGN PATENT DOCUMENTS

| CN | 101820343 A | 9/2010 |
| CN | 102739394 A | 10/2012 |
| WO | 2012044149 A1 | 4/2012 |

*Primary Examiner* — Hanh Phan
(74) *Attorney, Agent, or Firm* — Michael J. Donohue; Davis Wright Tremaine LLP

(57) ABSTRACT

The present invention utilizes a high-speed serial data transceiver to generate two high-speed electric pulse signals. After passing through a gain network, the signals are used for driving an electro-optic phase modulator (PM) so as to realize phase modulation of photon signals. The present invention may directly use a high-speed digital signal to realize a four-phase modulation function needed by the BB84 quantum key distribution protocol without using a digital to analog converter or an analog switch. This can prevent modulation rate from being restricted by links including digital-to-analog conversion, switching of the analog and the like. A dual-electrode electro-optic phase modulator scheme can also effectively reduce requirements for amplitude of a modulation driving signal, thus facilitating realization of high-speed phase modulation, which meets requirements of quantum key distribution.

25 Claims, 5 Drawing Sheets

(56) References Cited

U.S. PATENT DOCUMENTS

2006/0093376 A1 5/2006 Mitchell et al.
2007/0160212 A1 7/2007 Zavriyev et al.
2011/0015022 A1 1/2011 Stoeckl
2012/0087500 A1 4/2012 Ukita et al.

* cited by examiner

PHOTON PHASE MODULATING SYSTEM

This application is the United States National Phase of International Application PCT/CN2013/072350, filed Mar. 8, 2013.

TECHNICAL FIELD

The present disclosure relates to quantum cryptography, and more particularly, to a photon phase modulating system for high-speed quantum key distribution, thereby enabling a high-speed random modulation function of photon state as required by a quantum cryptography system.

BACKGROUND

With the development of communication technology, demands increase especially in secure communication field. In theory, benefits of quantum communication having absolute security attract more and more attentions. Quantum Key Distribution (QKD) is the core of quantum cryptography technology, which may achieve unconditional secure key distribution in the sense of cryptography between remote users. It is possible to realize unconditional secure communication by combining quantum cryptography technology and one-time pad. Therefore, as a new direction of cryptography, the quantum cryptography technology has been widely concerned.

A quantum key distribution system's operating rate is an important factor for deciding its key generation rate. Higher key generation rate means an ability of providing security safeguards in a wider range of applications. Therefore, improving the operating rate of the quantum key distribution system is of important significance. BB84 protocol is the most widely used quantum key distribution protocol. The protocol requires to encode a photon into four states randomly, i.e., randomly modulating a phase, polarization and the like physical quantities of the photon into one of four quantum states in two non-orthogonal basis. In ordinary single-mode optical fiber, phase-encoding scheme is usually employed since intrinsic birefringence effect of optical fiber will change the polarization of the photon.

One key technology for realizing a high-speed QKD system lies in how to achieve random and high-speed encoding and decoding of quantum signals. For a high-speed phase modulating system, an electro-optic modulation device based on lithium niobate ($LiNbO_3$) waveguide materials is usually used to realize phase modulation of a photon's phase, where a modulated phase is directly associated with a voltage driving signal loaded onto its driving electrode, and accuracy of the modulating voltage decides accuracy of the phase modulation. Due to a direct association between Quantum Bit Error Rate (QBER) of the QKD system and modulation accuracy of quantum state, a driving signal for phase modulation of the phase QKD system is demanding on signal to noise ratio and flatness. The existing method for generating a modulated quantum signal mainly includes digital to analog conversion, an analogue switch and the like methods. In a QKD system within 200 MHz, these methods usually meet speed and accuracy requirements for switching of modulating voltages. However, due to restrictions caused by establishment and stabilization time in the digital to analog conversion, switching time in the analogue switch and the like factors, it is difficult for these methods to meet requirements of modulation rates above 1 Gbps.

SUMMARY

In order to address the above questions existing in the prior art, the present invention provides a photon modulating system for high-speed quantum key distribution, which can realize a high-speed random modulation function of photon state as required by a high-speed quantum cryptography system.

According to a first aspect of the present disclosure, a photon phase modulating system is provided. The photon phase modulating system includes: a random number generating unit, configured to generate a random digital number; a parallel/serial converting unit, configured to perform parallel/serial conversion on the random digital number generated by the random number generating unit to obtain a serial random digital signal; a high-speed serial transceiver, configured to receive the serial random digital signals generated by the parallel/serial converting unit and outputting two separate digital driving signals; a gain control network, configured to perform gain control on the two separate digital driving signals respectively, and to generate two driving signals for driving an electro-optic phase modulator; and the electro-optic phase modulator having two separate modulation electrodes, each of which receives a corresponding one of the two driving signals, the electro-optic phase being configured to perform phase modulation on an inputted photon and implement four-phase modulation on the inputted photon based on a combination of the two separate digital driving signals.

According to a second aspect of the present disclosure, a photon phase modulating system is provided. The photon phase modulating system includes: a random number generating unit, configured to generate a random digital number; a parallel/serial converting unit, configured to perform parallel/serial conversion on the random digital number generated by the random number generating unit to obtain a serial random digital signal; a high-speed serial transceiver, configured to receive the serial random digital signal generated by the parallel/serial converting unit and output two separate digital driving signals; an adder circuit, configured to perform analogue summation on the two separate digital driving signals to obtain a four-level driving signal; a gain control network, configured to perform gain control on the four-level driving signal, and to generate a four-level driving signal for driving an electro-optic phase modulator; and the electro-optic phase modulator having a single modulation electrode, which receives the four-level driving signal for driving the electro-optic phase modulator, the electro-optic phase modulator being configured to perform phase modulation on an inputted photon and implement four-phase modulation on the inputted photon based on a combination of the two separate digital driving signals.

According to a third aspect of the present disclosure, a photon phase modulating system is provided. The photon phase modulating system includes: a random number generating unit, configured to generate a random digital number; a parallel/serial converting unit, configured to perform parallel/serial conversion on the random digital number generated by the random number generating unit to obtain a serials random digital signal; a high-speed serial transceiver, configured to receive the serials random digital signal generated by the parallel/serial converting unit and output two separate digital driving signals; a gain control network, configured to perform gain control on the two separate digital driving signals respectively and generate two driving signals; an adder circuit, configured to perform analogue summation on the two driving signals to obtain a four-level driving signal for driving an electro-optic phase modulator; and the electro-optic phase modulator having a single modulation electrode, which receives the four-level driving signal for driving the electro-optic phase modulator, the electro-optic phase modulator being configured to perform phase modulation on an inputted photon and implement four-phase modulation on the inputted photon based on a combination of the two separate digital driving signals.

According to the present disclosure, random modulation of quantum state of a quantum key distribution system at and above 1 GHz may be satisfied. The present disclosure may perform phase modulation based on a high-speed serial data communication interface without digital to analog conversion or an analog switch. This may prevent conversion time of the digital to analog conversion or switching time of the analog switch from restricting improvement of modulation rate, thereby efficiently improving an operating speed of the overall quantum key distribution system.

BRIEF DESCRIPTION OF THE DRAWINGS

The above and other objects, features, and advantages of the present disclosure will be clear through the following description of preferable embodiments of the present disclosure, in conjunction with drawings in which.

Throughout the drawings, the same or similar elements or steps are identified by the same or similar reference signs.

DETAILED DESCRIPTION OF EMBODIMENTS

Figure 1:
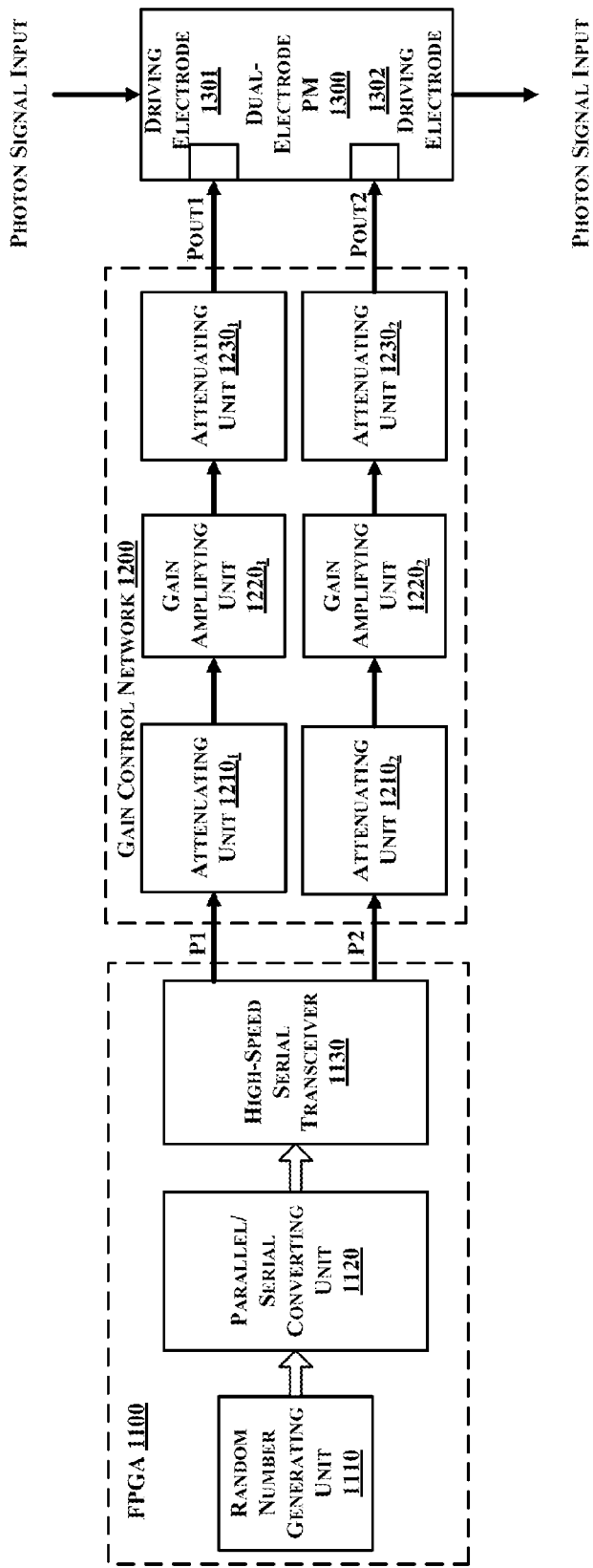
FIG. 1 shows a circuit structure diagram of a two-electrode phase modulation driving scheme according to the present invention.

In the following, preferable embodiments of the present disclosure will be detailed with reference to the drawings. In the description, details and functions unnecessary for the present invention will be omitted so as to avoid obscuring understanding of the present invention.

The present invention mainly provides a technical solution, which may meet random modulation of quantum states of a quantum key distribution system above 1 GHz. The present invention may perform phase modulation based on a high-speed serial data communication interface without using digital to analog conversion or an analogue switch. This may avoid conversion time of the digital to analog conversion or switching time of the analogue switch from restricting improvement of modulation rate, thereby efficiently improving an operating speed of the overall quantum key distribution system.

The present invention may utilize separate parallel/serial conversion chips or high-speed serial communication interfaces equipped on a FPGA chip to achieve required functionalities. The use of the high-speed serial communication interfaces included with the FPGA chip may effectively improve integrity of the system while facilitating a realization of an on-chip QKD master system. Taking Altera's Stratix IV GTFPGAEP4S100G2 as an example, its high-speed full-duplex transceiver may achieve a communication rate up to 11.3 Gbps, which is sufficient to produce a digital signal as required by QKD modulation above 2 Gbps.

Some optical media such as lithium niobate ($LiNbO_3$) may have its optical properties changed under an externally applied electric field. This is called as electro-optical effect. When applying a modulation voltage, the electro-optical effect may make a refractive index of the optical medium vary with the modulation voltage. When an optical path difference of two vertical components $E_x'$ and $E_y'$ of light wave is half wavelength ($\lambda/2$), i.e., a corresponding phase difference is 180 degree, a control voltage needed to apply may be called as half-wave voltage $V_\pi$. In the present invention, an electro-optical phase modulator (PM, phase modulator) is made based on the above electro-optical effect.

According to the BB84 protocol, Alice sends a serials of single photons to Bob via a quantum channel, and Bob randomly selects two-bit binary encoding (representing a voltage applied on the phase modulator, to which a randomly selected phase corresponds) and modulates each photon's phase by the phase modulator. When the photons return to the Alice side, Alice performs phase modulation on the photons by the phase modulator in the same principle. According to interference principle, keys of the both parties are generated by the detection of a single-photon detector.

From the above, the electro-optic phase modulator (PM) and the corresponding electronics modulation techniques are critical in the quantum key distribution system.

The BB84 protocol needs to randomly modulate a photon's phase into one of 0, $\pi/2$, $\pi$, and $3\pi/2$. This will introduce two issues in the high-speed QKD system:

1) In general, a half-wave voltage required by the PM controlled phase modulation is high. In order to reach $3\pi/2$, a peak value of the modulation voltage is often needed to reach up to 6V or even 8V. Taking JDSU PM-150-080 phase modulator (having a bandwidth of 10 GHz) as an example, its half-wave voltage $V_\pi@10$ GHz even reaches 11V. Due to the accuracy requirement of QKD modulation, an amplification circuit is generally needed to have a better gain within a bandwidth ranging from tents of KHz to above 6 GHz at a modulation frequency of 1 bps. On basis of this, if output amplitude is needed to reach 6V, or even above 8V, there are high demands on characteristics of a broadband amplification circuit, thereby increasing complexity of circuit design and limiting device selection.

2) Phase modulation as required by the quantum key distribution requires for high modulation accuracy. Moreover, it may be needed to adjust a modulation driving signal's level depending on different devices. So, a phase modulated signal is required to be flat and adjustable. With such a requirement, it is difficult to generate a four-level high-speed modulation signal. If using the digital to analog conversion or the analogue switch, great restrictions will be introduced for the photon's modulation speed and accuracy when proceeding with a modulation rate of above 1 Gbps, thereby limiting the operating speed of the overall quantum key distribution system.

According to the requirements of the BB84 protocol, a sender for performing the quantum key distribution needs to perform random four-phase modulation on photons. A receiver may perform four-phase modulation (0, $\pi/2$, $\pi$, and $3\pi/2$) or two-phase modulation (0, $\pi/2$). It is advantageous in security for the receiver to employ the four-phase modulation. The present invention may be applicable to both the four-phase modulation and the two-phase modulation.

There are two manners for using two driving signals, which are generated by the high-speed parallel/serial converting unit, for driving phase modulating devices in the quantum key distribution system, i.e., a dual-electrode phase modulation driving manner and a single-electrode phase modulation driving manner.

Dual-Electrode Phase Modulation Driving Manner

FIG. 1 shows a circuit structure diagram of a two-electrode phase modulation driving scheme according to the present invention. As shown in FIG. 1, FPGA 1100 is used to implement a random number generating unit 1110, a parallel/serial converting unit 1120, and a high-speed serial transceiver 1130. However, the present invention is not limited to this, and the parallel/serial converting unit 1120 and the high-speed serial transceiver 1130 may be also implemented by using separate chips. For example, the parallel/serial converting unit 1120 may be implemented by a Gigabit Ethernet chip.

In FIG. 1, FPGA 1100 may complete conversion from a random number to a driving signal, and then output two separate driving signals P1 and P2 via a high-speed serial communication interface (the high-speed serial transceivers 1130) of the FPGA 1100. Specifically, the random number generating unit 1110 generates a random digital signal, the parallel/serial converting unit 1120 performs parallel/serial conversion on the random digital number generated by the random number generating unit 1110 to obtain a serial random digital signal, and then the high-speed serial transceiver 1130 outputs the two separate digital driving signals P1 and P2. The parallel/serial converting unit may either employ an encoding scheme such as 8B/10B encoding, or directly outputs in serial the random digital signal generated by the random number generating unit 1110.

The two driving signals P1 and P2 are input into a gain control network 1200. Phase modulating devices manufactured by different manufacturers in different processes usually have different half-wave voltages. The gain control network 1200 plays a role of adjusting a driving voltage's output amplitude, so as to adapt it to a phase modulator. For example, as shown in FIG. 1, the gain control network 1200 may include attenuating units 1210₁ and 1230₁ and a gain amplifying unit 1220₁ for the driving signal P1, and attenuating units 1210₂ and 1230₂ and a gain amplifying unit 1220₂ for the driving signal P2. The attenuating units (1210₁, 1230₁, 1230₁, and 1230₂, collectively referred to as 1210 and 1230) may be used as options. When a dynamic range, which may be adjusted by the gain amplifying units (1220₁ and 1220₂, collectively referred to as 1220) and the adjustment accuracy can satisfy the requirements of phase modulation, it is not needed to use the attenuating units 1210 and 1230. That is, for each driving signal P1 or P2, the gain control network 1200 includes only one of the gain amplifying units, i.e., 1220₁ or 1220₂. If it is difficult to meet the adjustment requirements due to the limitation of the gain amplifying unit 1220's own performance, the attenuating units 1210 and 1230 may be added to improve the adjustment accuracy and the dynamic range.

Take the driving signal P1 as an example (the operation on the driving signal P2 is similar). After passing through the first attenuating unit 1210₁, the driving signal P1 is inputted into the gain amplifying unit 1220₁. Then, the amplified signal is inputted into the second attenuating unit 1230₁. After having the driving signal P1 passing through the attenuating unit 1210₁, the gain amplifying unit 1220₁ and the second attenuating unit 1230₁, an output signal Pout1 may have a great dynamic adjustment arrange. The first attenuating unit 1210₁ serves to improve an adjustable dynamic range of the signal, but the following amplifying stage (i.e., the gain amplifying unit 1220₁) reduces accuracy of the signal. Therefore, the second attenuating unit 1230₁ following the amplifying stage (i.e., the gain amplifying unit 1220₁) may perform accurate attenuation control.

The gain control network 1200 may be of a multi-stage cascade. The attenuating units 1210 and 1230 and the gain amplifying unit 1220 may have fixed or adjustable gains. The gain amplifying unit 1220 may be built by using an integrated amplifier chip or discrete circuits. The attenuating units 1210 and 1230 may employ active chips and circuits, or passive devices and circuits. The gain amplifying unit 1220 needs to be capable of performing gain adjustment on the two digital signals, respectively. The driving signals P1 and P2 passing through the gain control network 1200 are used to drive an electro-optic phase modulator 1300 having two separate electrodes 1301 and 1302, as shown in FIG. 1.

After the gain control, the two driving signals Pout1 and Pout2 are inputted into the electro-optic phase modulator (PM) 1300 having the two separate electrodes 1301 and 1302, and then are modulated as having phases 0 and $\pi/2$ and phases 0 and $\pi$, respectively. The four-phase modulation may be realized by a phase combination of the driving electrodes 1301 and 1302. For example, correspondences between the driving signals P1 and P2 and modulation phases may be set by referring to Table 1. When a gain for the driving signal P1 is a half-wave voltage of the drove electro-optic phase modulator 1300, the electro-optic phase modulator 1300 may be used to generate a modulation phase $\pi$ if the half-wave voltage is of a high level (digital signal '1'), and the electro-optic phase modulator 1300 may be used to generate a modulation phase 0 if the half-wave voltage is of a low level (digital signal '0'). When a gain for the driving signal P2 is half the half-wave voltage of the electro-optic phase modulator 1300, the electro-optic phase modulator 1300 may be used to generate a modulation phase $\pi/2$ if the half-wave voltage is of a high level (digital signal '1'), and the electro-optic phase modulator 1300 may be used to generate a modulation phase 0 if the half-wave voltage is of a low level (digital signal '0'). Through combining the two digital driving signals P1 and P2, the required four-phase modulation may be achieved.

TABLE 1

Settings of Signal Levels and corresponding Modulation Phases

| P1 | P2 = 0 | P2 = 1 |
|---|---|---|
| 0 | 0 | $\pi/2$ |
| 1 | $\pi$ | $3\pi/2$ |

However, the present invention is not limited to this, and other suitable settings may be also applicable. For example, in high-speed devices, there are usually matched resistors, which require that a DC component of a modulated signal is close to 0. Thus, a modulation scheme as shown in Table 2 may be similarly used for achieving modulation of two sets of basis and four quantum states as desired by the BB84 protocol. That is, when a gain for the driving signal P1 is a half-wave voltage of the drove electro-optic phase modulator 1300, the electro-optic phase modulator 1300 may be used to generate a modulation phase $\pi/2$ if the half-wave voltage is of a high level (digital signal '1'), and the electro-optic phase modulator 1300 may be used to generate a modulation phase $-\pi/2$ if the half-wave voltage is of a low level (digital signal '0'). When a gain for the driving signal P2 is half the half-wave voltage of the electro-optic phase modulator 1300, the electro-optic phase modulator 1300 may be used to generate a modulation phase $\pi/4$ if the half-wave voltage is of a high level (digital signal '1'), and the electro-optic phase modulator 1300 may be used to generate a modulation phase $-\pi/4$ if the half-wave voltage is of a low level (digital signal '0'). Through combining the two digital driving signals P1 and P2, the required four-phase modulation may be achieved.

TABLE 2

Settings of Modified Levels and corresponding Modulation Phases

| P1 | P2 | |
|---|---|---|
|  | 0 | 1 |
| 0 | $-3\pi/4$ | $-\pi/4$ |
| 1 | $\pi/4$ | $3\pi/4$ |

Single-Electrode Phase Modulation Driving Manner

Figure 2A:
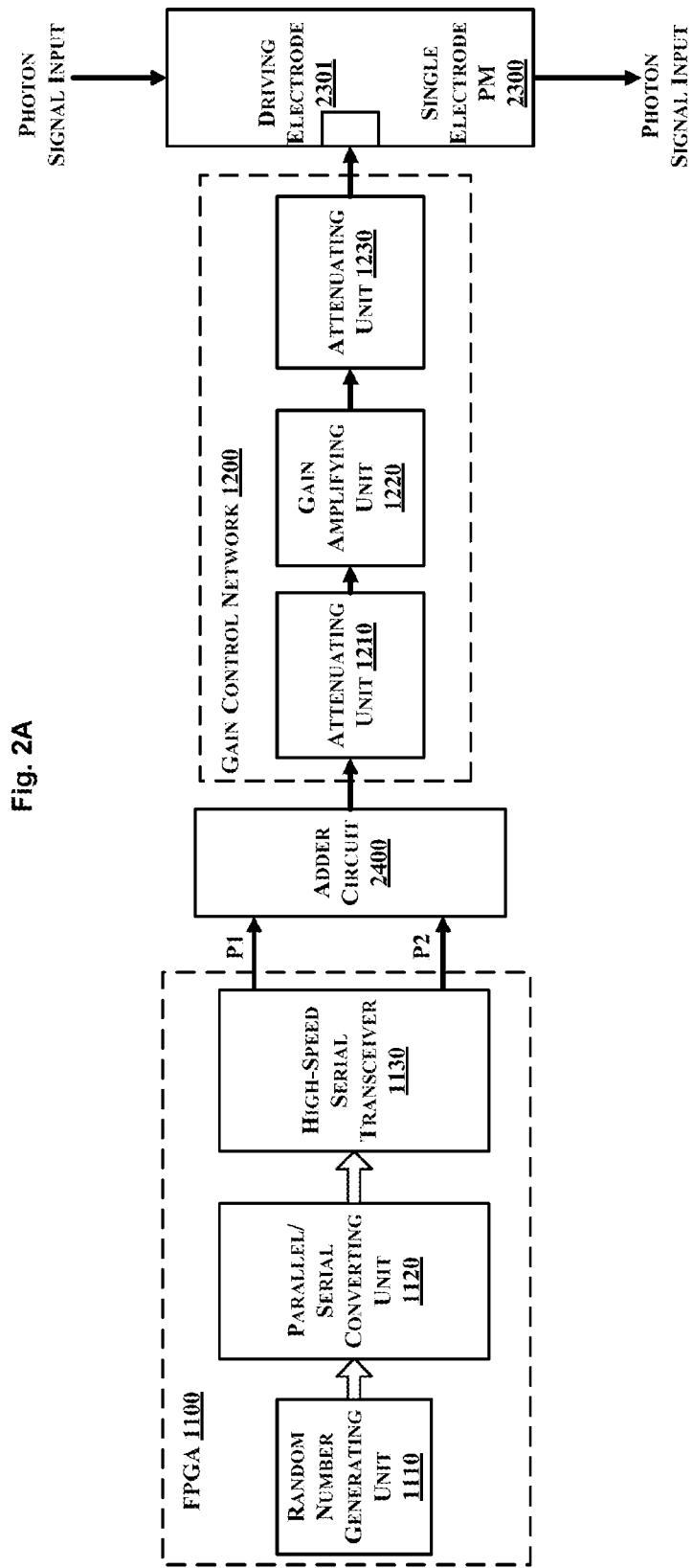
FIGS. 2A and 2B show circuit structure diagrams of a single-electrode digital phase modulation scheme according to the present invention.
Figure 2B:
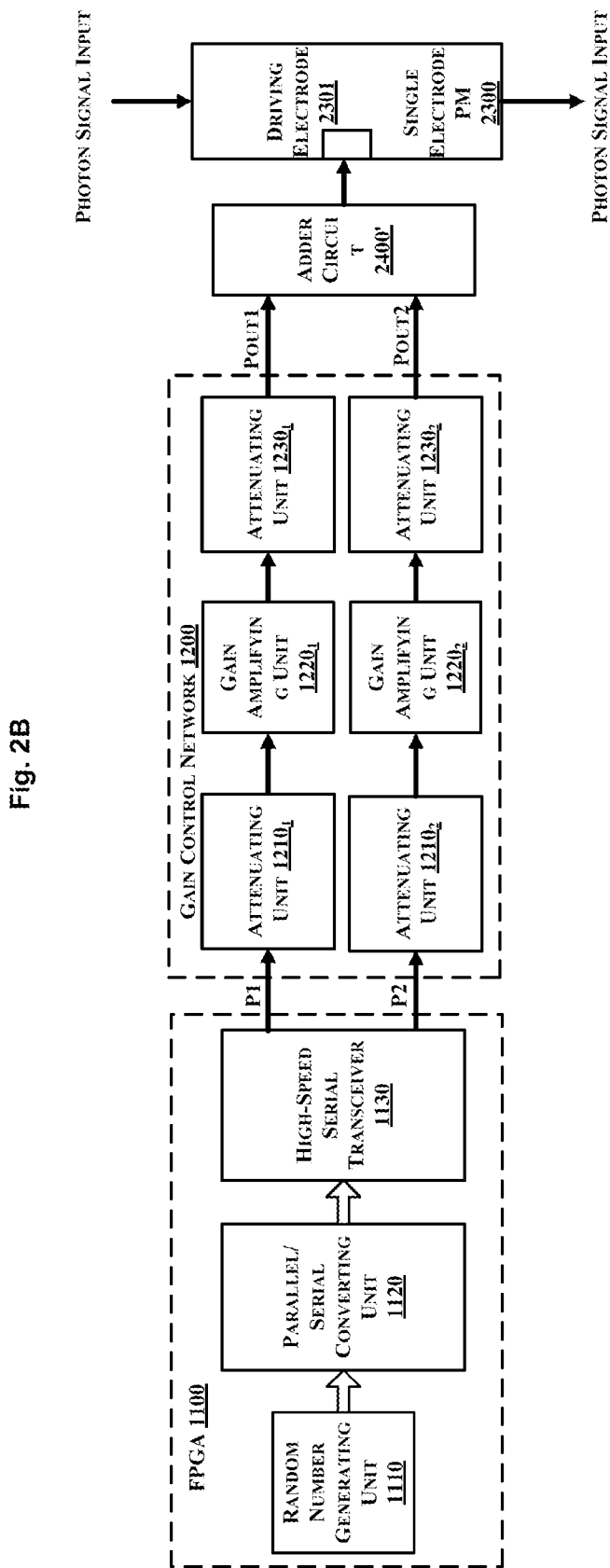

FIGS. 2A and 2B show circuit structure diagrams of a single-electrode phase modulation driving scheme according to the present invention. In FIGS. 2A and 2B, the same components as those of FIG. 1 are denoted with the same reference signs. For brevity, detailed descriptions of the same elements may refer to the above detailed descriptions given with reference to FIG. 1, and thus are omitted here.

FIG. 2A differs from FIG. 1 in that for an electro-optic phase modulator 2300 having only one separate electrode 2301, an adder circuit 2400 is set between the high-speed serial transceiver 1130 and the gain control network 1200, for performing analogue summation on the driving signals P1 and P2 (e.g., calculating 2×P1+P2) to obtain a four-level driving signal for driving the single-electrode electro-optic phase modulator 2300. The adder circuit 2400 may be implemented by using an active chip or a passive impedance network.

In the configuration as shown in FIG. 2A, as it is to amplify a voltage in a relatively large dynamic range, the accuracy requirement for the gain control network 1200 becomes high. In order to reduce the accuracy requirement for the gain control network 1200, the configuration as shown in FIG. 2B may be employed. FIG. 2B differs from FIG. 1 in that for an electro-optic phase modulator 2300 having only one separate electrode 2301, an adder circuit 2400' is set between the gain control network 1200 and the electro-optic phase modulator 2300, for performing analogue summation on the driving signals Pout1 and Pout2 (e.g., calculating Pout1+Pout2) to obtain a four-level driving signal for driving the single-electrode electro-optic phase modulator 2300. The adder circuit 2400' may be implemented by using an active chip or a passive impedance network.

Compensation for Device Temperature Drift

Typically, lithium niobate (LiNbO$_3$) waveguide's half-wave voltage of and modulation curve are related to temperature. Different vendors have different temperature drift control technologies, such that distinction can be made between good and bad for device temperature drift characteristics. In order to make the present solution more applicable to a variety of devices, two methods may be applied to reduce adverse effect of the low temperature drift.

Figure 3:
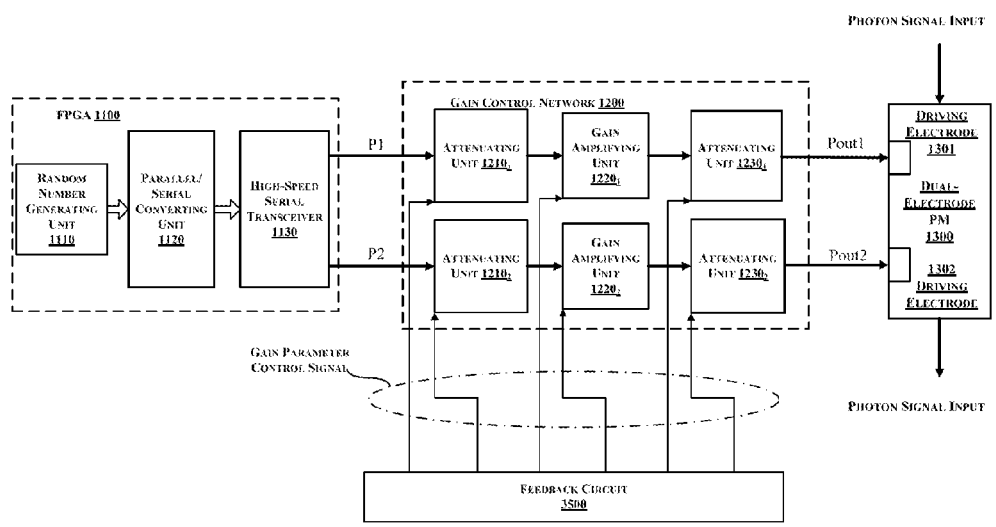
FIG. 3 shows a circuit structure diagram of a device temperature drift feedback compensation scheme.

FIG. 3 shows a circuit structure diagram of a device temperature drift feedback compensation scheme, which takes the two-electrode phase modulation driving manner (see FIG. 1) as an example. However, the present invention is not limited to this, and may be also applicable to the single-electrode phase modulation driving manner (see FIG. 2A or FIG. 2B).

In FIG. 3, a feedback circuit 3500 is added for measuring a variant of the half-wave voltage caused by temperature drift of the electro-optic phase modulator 1300. The feedback circuit 3500 generates a gain parameter control signal based on the measured variant of the half-wave voltage. The gain parameter control signal is fed back to the gain control network 1200 for controlling attenuating coefficients of the attenuating units 1210 and 1230 and gain coefficients the gain amplifying units 1220, so as to compensate for the variant of the half-wave voltage caused by the temperature drift of the electro-optic phase modulator 1300. In general, in a practical QKD system, the feedback circuit 3500 measures a quantum bit error rate as an input signal, and generates the gain parameter control signal by using a method such as the PID algorithm. The gain parameter control signal is used for controlling the gain control network 1200, so that when temperature changes, the driving signals P1 and P2 may still enable the electro-optic phase modulator 1300 to generate corresponding correct modulation phases (e.g., Table 1 or Table 2).

Control of Device Temperature

Figure 4:
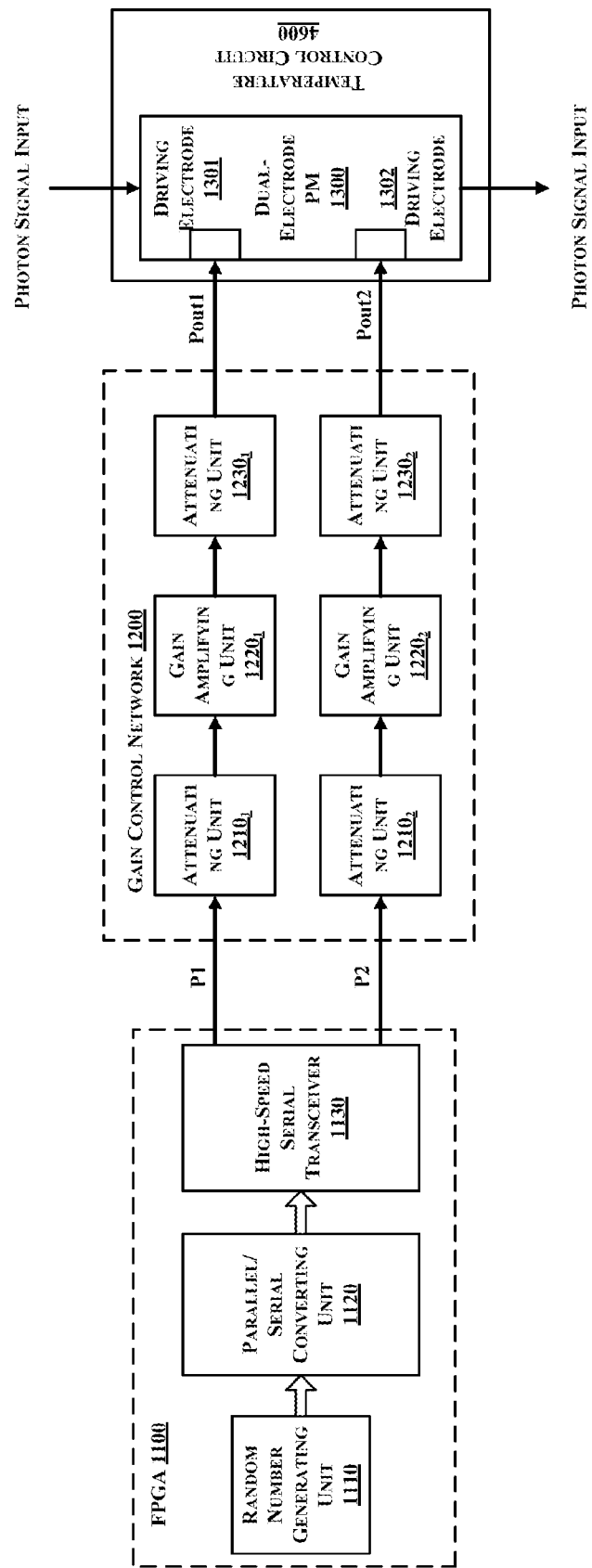
FIG. 4 shows a circuit structure diagram of a device temperature control scheme.

FIG. 4 shows a circuit structure diagram of a device temperature control scheme, which takes the two-electrode phase modulation driving manner (see FIG. 1) as an example. However, the present invention is not limited to this, and may be also applicable to the single-electrode phase modulation driving manner (see FIG. 2A or FIG. 2B).

In FIG. 4, a temperature control circuit 4600 is added for keeping an operating temperature of the electro-optic phase modulator 1300 at a set temperature (e.g., a factory set temperature). Therefore, according to the driving signals P1 and P2, the electro-optic phase modulator 1300 may modulate a photon to a corresponding correct modulation phase (e.g., Table 1 or Table 2).

The present disclosure has been described in connection with the preferable embodiments. It should be understood that those skilled in the art can make various other changes, alternations, and supplementations without departing from the spirit and scope of the present disclosure. Therefore, the scope of the present disclosure is not limited to the above specific embodiments, but is defined by the following claims.

What is claimed is:

1. A photon phase modulating system, comprising:
   a random number generating unit, configured to generate a random digital number;
   a parallel/serial converting unit, configured to perform parallel/serial conversion on the random digital number generated by the random number generating unit to obtain a serial random digital signal;
   a high-speed serial transceiver, configured to receive the serial random digital signals generated by the parallel/serial converting unit and outputting two separate digital driving signals;
   a gain control network, configured to perform gain control on the two separate digital driving signals respectively, and to generate two driving signals for driving an electro-optic phase modulator; and
   the electro-optic phase modulator having two separate modulation electrodes, each of which receives a corresponding one of the two driving signals, the electro-optic phase being configured to perform phase modulation on an inputted photon and implement four-phase modulation on the inputted photon based on a combination of the two separate digital driving signals.

2. The photon phase modulating system according to claim 1, further comprising:
   a feedback circuit, configured to measure an variation of a half-wave voltage caused by temperature drift of the electro-optic phase modulator, to generate a gain parameter control signal based on the measured variation of the half-wave voltage, and to feed the gain parameter control signal back to the gain control network for controlling a gain of the gain control network, so as to compensate for the variation of the half-wave voltage caused by the temperature drift of the electro-optic phase modulator.

3. The photon phase modulating system according to claim 1, further comprising:
 a temperature control circuit for keeping an operating temperature of the electro-optic phase modulator at a set temperature.

4. The photon phase modulating system according to claim 1, wherein
 the random number generating unit, the parallel/serial converting unit and the high-speed serial transceiver are implemented by a single FPGA chip.

5. The photon phase modulating system according to claim 1, wherein the gain control network further comprises:
 a first attenuating unit, configured to attenuate an input signal;
 a gain amplifying unit, configured to amplify the signal attenuated by the first attenuating unit; and
 a second attenuating unit, configured to attenuate the signal amplified by the gain amplifying unit.

6. The photon phase modulating system according to claim 5, wherein the first attenuating unit, the gain amplifying unit or the second attenuating unit has a fixed gain or an adjustable gain.

7. The photon phase modulating system according to claim 1 wherein
 a gain for one of the two separate digital driving signals is a half-wave voltage of the electro-optic phase modulator, and a gain for the other of the two separate digital driving signals is half the half-wave voltage of the electro-optic modulator.

8. The photon phase modulating system according to claim 7, wherein correspondences between the two separate digital driving signals P1 and P2 and a modulation phase generated by the electro-optic phase modulator are expressed in the following table:

|    | P2 | |
|----|----|----|
| P1 | 0 | 1 |
| 0  | 0 | $\pi/2$ |
| 1  | $\pi$ | $3\pi/2$ | wherein the first column is a value of one of the two separate digital driving signals, P1, the first row is a value of the other one of the two separate digital driving signals, P2, and numeric values in cells are corresponding modulation phases generated by the electro-optic phase modulator.

9. The photon phase modulating system according to claim 7, wherein correspondences between the two separate digital driving signals P1 and P2 and a modulation phase generated by the electro-optic phase modulator are expressed in the following table:

|    | P2 | |
|----|----|----|
| P1 | 0 | 1 |
| 0  | $-\pi 3/4$ | $-\pi/4$ |
| 1  | $\pi/4$ | $3\pi/4$ | wherein the first column is a value of one of the two separate digital driving signals, P1, the first row is a value of the other one of the two separate digital driving signals, P2, and numeric values in cells are corresponding modulation phases generated by the electro-optic phase modulator.

10. A photon phase modulating system, comprising:
 a random number generating unit, configured to generate a random digital number;
 a parallel/serial converting unit, configured to perform parallel/serial conversion on the random digital number generated by the random number generating unit to obtain a serials random digital signal;
 a high-speed serial transceiver, configured to receive the serial random digital signal generated by the parallel/serial converting unit and output two separate digital driving signals;
 an adder circuit, configured to perform analogue summation on the two separate digital driving signals to obtain a four-level driving signal;
 a gain control network, configured to perform gain control on the four-level driving signal, and to generate a four-level driving signal for driving an electro-optic phase modulator; and
 the electro-optic phase modulator having a single modulation electrode, which receives the four-level driving signal for driving the electro-optic phase modulator, the electro-optic phase modulator being configured to perform phase modulation on an inputted photon and implement four-phase modulation on the inputted photon based on a combination of the two separate digital driving signals.

11. The photon phase modulating system according to claim 10, wherein the adder circuit performs the following analogues summation on the two separate digital driving signals P1 and P2: 2×P1+P2.

12. The photon phase modulating system, according to claim 10, further comprising:
 a feedback circuit, configured to measure a variation of a half-wave voltage caused by temperature drift of the electro-optic phase modulator, to generate a gain parameter control signal based on the measured variation of the half-wave voltage, and to feed the gain parameter control signal back to the gain control network for controlling a gain of the gain control network, so as to compensate for the variation of the half-wave voltage caused by the temperature drift of the electro-optic phase modulator.

13. The photon phase modulating system according to claim 10, further comprising:
 a temperature control circuit for keeping an operating temperature of the electro-optic phase modulator at a set temperature.

14. The photon phase modulating system according to claim 10, wherein
 the random number generating unit, the parallel/serial converting unit and the high-speed serial transceiver are implemented by a single FPGA chip.

15. The photon phase modulating system according to claim 10, wherein the gain control network further comprises:
 a first attenuating unit, configured to attenuate an input signal;
 a gain amplifying unit, configured to amplify the signal attenuated by the first attenuating unit; and
 a second attenuating unit, configured to attenuate the signal amplified by the gain amplifying unit.

16. The photon phase modulating system according to claim 15, wherein the first attenuating unit, the gain amplifying unit or the second attenuating unit has a fixed gain or an adjustable gain.

17. A photon phase modulating system, comprising:
 a random number generating unit, configured to generate a random digital number;

a parallel/serial converting unit, configured to perform parallel/serial conversion on the random digital number generated by the random number generating unit to obtain a serial random digital signal;

a high-speed serial transceiver, configured to receive the serial's random digital signal generated by the parallel/serial converting unit and output two separate digital driving signals;

a gain control network, configured to perform gain control on the two separate digital driving signals respectively and generate two driving signals;

an adder circuit, configured to perform analogue summation on the two driving signals to obtain a four-level driving signal for driving an electro-optic phase modulator; and the electro-optic phase modulator having a single modulation electrode, which receives the four-level driving signal for driving the electro-optic phase modulator, the electro-optic phase modulator being configured to perform phase modulation on an inputted photon and implement four-phase modulation on the inputted photon based on a combination of the two separate digital driving signals.

18. The photon phase modulating system according to claim 17, further comprising:

A feedback circuit, configured to measure an variation of a half-wave voltage caused by temperature drift of the electro-optic phase modulator, to generate a gain parameter control signal based on the measured variation of the half-wave voltage, and to feed the gain parameter control signal back to the gain control network for controlling a gain of the gain control network, so as to compensate for the variation of the half-wave voltage caused by the temperature drift of the electro-optic phase modulator.

19. The photon phase modulating system according to claim 17, further comprising:

a temperature control circuit for keeping an operating temperature of the electro-optic phase modulator at a set temperature.

20. The photon phase modulating system according to claim 17, wherein the random number generating unit, the parallel/serial converting unit and the high-speed serial transceiver are implemented by a single FPGA chip.

21. The photon phase modulating system according to claim 17, wherein the gain control network further comprises:

a first attenuating unit, configured to attenuate an input signal;

a gain amplifying unit, configured to amplify the signal attenuated by the first attenuating unit; and a second attenuating unit, configured to attenuate the signal amplified by the gain amplifying unit.

22. The photon phase modulating system according to claim 21, wherein the first attenuating unit, the gain amplifying unit or the second attenuating unit has a fixed gain or an adjustable gain.

23. The photon phase modulating system according to claim 17, wherein a gain for one of the two separate digital driving signals is a half-wave voltage of the electro-optic phase modulator, and a gain for the other of the two separate digital driving signals is half the half-wave voltage of the electro-optic modulator.

24. The photon phase modulating system according to claim 23, wherein correspondences between the two separate digital driving signals P1 and P2 and a modulation phase generated by the electro-optic phase modulator are expressed in the following table:

| P1 | P2 | |
|---|---|---|
|  | 0 | 1 |
| 0 | 0 | $\pi/2$ |
| 1 | $\pi$ | $3\pi/2$ | wherein the first column is a value of one of the two separate digital driving signals, P1, the first row is a value of the other one of the two separate digital driving signals, P2, and numeric values in cells are corresponding modulation phases generated by the electro-optic phase modulator.

25. The photon phase modulating system according to claim 23, wherein correspondences between two separate digital driving signals P1 and P2 and a modulation phase generated by the electro-optic phase modulator are expressed in the following table:

| P1 | P2 | |
|---|---|---|
|  | 0 | 1 |
| 0 | $-\pi 3/4$ | $-\pi/4$ |
| 1 | $\pi/4$ | $3\pi/4$ | wherein the first column is a value of one of the two separate digital driving signals, P1, the first row is a value of the other one of the two separate digital driving signals, P2, and numeric values in cells are corresponding modulation phases generated by the electro-optic phase modulator.

* * * * *